Feb. 8, 1927. 1,617,035
A. STIPECH
DIRECTION SIGNAL FOR AUTOMOBILES
Filed Nov. 8, 1923
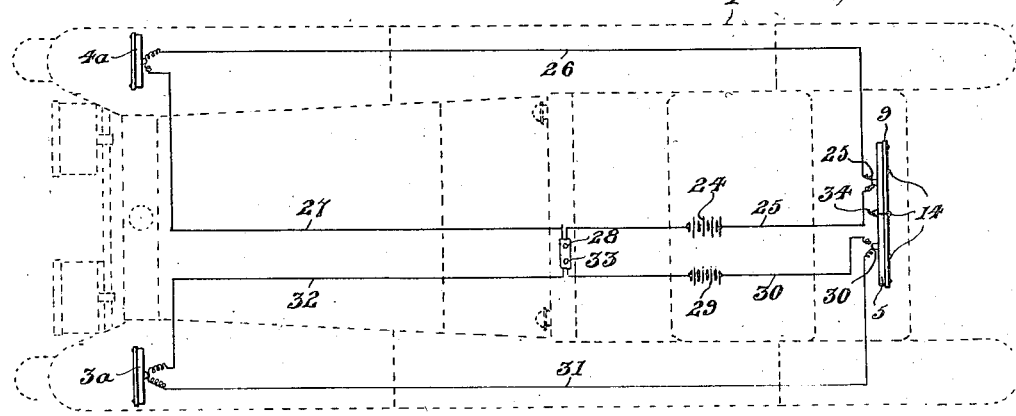
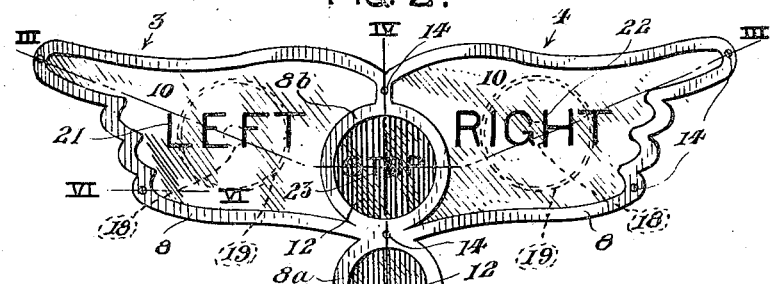
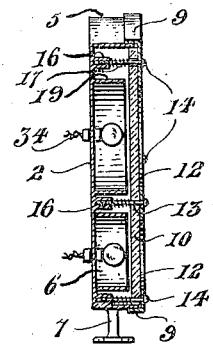
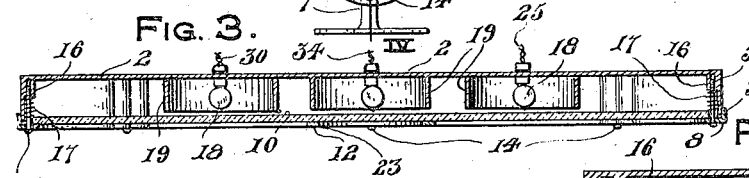
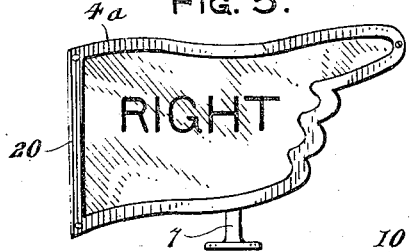
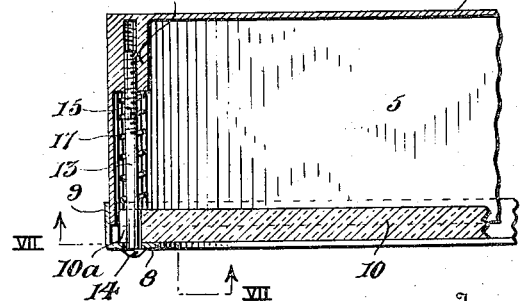
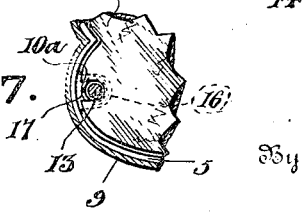
Inventor
A. Stipech
By F. K. Bryant,
Attorney Patented Feb. 8, 1927.

1,617,035

UNITED STATES PATENT OFFICE.

ANDREW STIPECH, OF FLINT, MICHIGAN.

DIRECTION SIGNAL FOR AUTOMOBILES.

Application filed November 8, 1923. Serial No. 673,534.

This invention relates to certain new and useful improvements in direction signals for automobiles and has for its primary object to provide signal arms and a stop indication associated with the usual rear light and adapted to be selectively illuminated for indicating a change in the direction of travel of the automobile, the direction signals being positioned at the front and rear ends of the automobile to be clearly viewable by approaching vehicles or those following.

Another object of the invention is to provide a direction signal for automobiles wherein a casing enclosing a plurality of selectively illuminated lamps has a shield or guard associated with each lamp directly in rear of the signal indicia, such as left, right and stop, a further novel feature of the signal casing including the resilient mounting of the transparent glass plate at the open side of the signal casing.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 diagrammatically illustrates by dotted lines in top plan, an automobile with the direction signal apparatus and electric wiring therefor illustrated in full lines, Figure 2 is an elevational view of the direction signal located at the rear end of the automobile, Figure 3 is a longitudinal sectional view taken on line III—III of Fig. 2 showing the guard associated with the signal lamp, Figure 4 is a vertical cross-sectional view taken on line IV—IV of Fig. 2, Figure 5 is an elevational view of one of the signal devices mounted at the front end of the automobile, Figure 6 is an enlarged detail sectional view taken on line VI—VI of Fig. 2 showing the resilient mounting for the front glass plate of the signal casing, and Figure 7 is a detail sectional view taken on line VII—VII of Fig. 6.

The direction signal apparatus is associated with an automobile generally designated by the reference numeral 1 in Fig. 1 and includes a double casing construction in the form of two hands adjacently positioned and pointing in opposite directions for mounting upon the rear end of the automobile while a single hand indicator is mounted upon each front fender of the automobile. The double casing construction includes a rear wall 1 of the general configuration in plan view of a pair of hands 3 and 4 pointing respectively in opposite directions to the left and right and having a right angular wall 5 projecting laterally from the peripheral edge thereof as shown in Fig. 3.

The lower side of the casing intermediate the ends thereof carries a depending circular casing section 6 with a depending mounting bracket 7 to secure the signal casing upon the automobile, the edge wall 5 of the signal casing continuing as a part of the depending circular casing 6 as illustrated.

A flanged rim is associated with the outer free edge of the edge wall 5 and includes a forward portion 8 overlying the open side of the casing as shown in Fig. 6 and an angle side leg portion 9 slidable on the edge wall 5, the lower central edge of the rim 8 overlying the depending circular casing 6 as at $8^a$ while a circular rim portion $8^b$ is disposed directly in front of the open side of the casing between the hand portions thereof.

A glass plate 10 closes the outer side of the signal casing and has rib sections 11 and 12 associated with the rim portions $8^a$ and $8^b$ respectively, the edge of the glass plate 10 being of the general design of the casing and sliding within the open edge wall 5 thereof as shown in Fig. 6. To retain the glass plate 10 in position and in engagement with the outer side 8 of the angle rim against any loose play or vibration, and for retaining the angle rim in position at the open side of the casing, there is provided a plurality of bolts 13 having heads 14 at their outer ends engaging the outer sides 8 of the rim and passing through cutaway portions $10^a$ in the peripheral edge of the glass plate 10, the inner ends of the bolts 13 being threaded as at 15 and entering threaded sockets formed in bosses 16 alined therewith and carried by the bottom and edge walls of the casing. A coil spring 17 surrounds each bolt 13 engaging at its inner end the outer end of a boss 16 while the outer end of the spring 17 engages the adjacent inner edge face of the glass plate 10 for holding the same in engagement with the outer side 8 of the casing rim.

A series of lamps 18 is mounted through the rear wall 2 of the casing, respectively centrally disposed with respect to each hand portion 3 and 4, and the rim portions 8$^a$ and 8$^b$, a circular guard wall 19 surrounding each lamp 18 to prevent entire illumination of the casing when one of the lamps is in operation.

The signal casing shown in Fig. 5 is adapted for mounting upon the front fenders of the automobile and is of similar construction to the signal casing illustrated in Fig. 2, except that only one hand portion 4$^a$ is provided and has a cross end wall 20. The glass plate 10 as illustrated in Fig. 2 has a legend 21 of the word "Left" on the left hand section 3 thereof while the right hand section 4 has the legend 22 of the word "Right." The colored glass 12 contains the legend 23 of the word "Stop" while the colored glass plate 12 at the lower end of the casing is employed for a rear light or parking signal.

The electric wiring and battery for illuminating the several lamps are shown in Fig. 1, the battery 24 having a wire connection 25 with the lamp 18 in the right hand section 4, the wire 25 continuing from the right hand lamp casing as at 26 to the lamp in the right hand signal 4$^a$ at the front of the machine, a wire 27 returning therefrom to the battery. The return wire 27 is connected to the spring button 28. A battery 29 has a wire connection 30 with the lamp in the left hand section of the signal casing and continues therefrom as at 31 to the left hand signal casing 3$^a$ at the front end of the machine, the wire 32 returning to the battery 29 and being associated with the switch button 33. The wire 34 of the stop signal lamp within the signal casing is in communication with the battery of the car and illumination thereof is controlled by the operation of the clutch or brake pedal as is common in this art.

From the above detail description of the device, it is believed that the construction and operation thereof will at once be apparent, it being noted that one of the novel features of the device resides in the particular mounting of the glass plate 10 in the open side of the casing, the glass plate being resiliently supported in engagement with the outer side 8 of the angle rim as shown in Fig. 6 by the coil spring 17, the bolt 13 anchoring the rim upon the outer side of the casing.

While there is herein shown and described the preferred embodiment of the present invention, it is nevertheless to be understood that minor changes may be made therein without departing from the spirit and scope of the invention as claimed.

What is claimed as new is:—

In a direction signal for automobiles, a signal casing including side walls projecting at right angles therefrom, a rim having a flange embracing the outer edges of the side walls adapted to keep the signal housing free from moisture, a glass plate closing the outer side of the casing enclosed by the rim, inwardly directed, internally screw threaded bosses formed upon the rear wall of said casing, screw bolts passing through the rim and anchored in the bosses of said casing, said bolts having heads bearing on the outer face of the rim, coil springs surrounding the bolts and engaging the bosses of the casing and glass plate for holding the glass plate in engagement with the rim against vibration, said plate fitting within the side walls of the casing and having openings for said bolts.

In testimony whereof I affix my signature.

ANDREW STIPECH.